(12) United States Patent
Rifkin et al.

(10) Patent No.: US 8,972,416 B1
(45) Date of Patent: Mar. 3, 2015

(54) MANAGEMENT OF CONTENT ITEMS

(71) Applicant: Amazon Technologies, Inc., Reno, NV (US)

(72) Inventors: Erin Nicole Rifkin, Seattle, WA (US); Joshua Drew Ramsden-Pogue, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/689,045

(22) Filed: Nov. 29, 2012

(51) Int. Cl.
*G06F 17/30* (2006.01)
*H04W 4/00* (2009.01)

(52) U.S. Cl.
CPC ...... *G06F 17/3007* (2013.01); *G06F 17/30985* (2013.01); *H04W 4/005* (2013.01)
USPC ........... 707/749; 707/748; 707/802; 704/231; 704/233; 704/236; 726/28; 726/4

(58) Field of Classification Search
CPC .......... G06F 17/30985; G06F 17/3074; G06F 17/30017; G06F 17/30781; G06F 17/24; G06F 17/30; G06F 17/3007; G11B 27/36; H01L 12/1813; H04W 4/005; H04N 21/235; H04N 21/435; H04N 21/84; H04L 12/1813; G10L 15/08
USPC ......... 707/695, 600, 606, 621, 821, 802, 804, 707/E17.059, E17.014, E17.032, 772, 705, 707/749, 758, 748, 746, 722, 769, 706, 770, 707/771, 913, 780, 688, 895; 704/235.26, 704/243, 254, 235, 231, 270, E15.043, 236, 704/233
See application file for complete search history.

(56) References Cited

U.S. PATENT DOCUMENTS

| | | | |
|---|---|---|---|
| 8,078,603 B1* | 12/2011 | Chandratillake et al. | 707/706 |
| 8,196,045 B2* | 6/2012 | Chandratillake et al. | 715/719 |
| 8,341,527 B2* | 12/2012 | Gupte | 715/723 |
| 2001/0022888 A1* | 9/2001 | Lewis et al. | 386/46 |
| 2007/0186235 A1* | 8/2007 | Jarman et al. | 725/28 |
| 2007/0288518 A1* | 12/2007 | Crigler et al. | 707/104.1 |
| 2008/0273712 A1* | 11/2008 | Eichfeld et al. | 381/86 |
| 2009/0285551 A1* | 11/2009 | Berry | 386/95 |
| 2010/0241963 A1* | 9/2010 | Kulis et al. | 715/727 |
| 2011/0110647 A1* | 5/2011 | Prorock et al. | 386/264 |

(Continued)

OTHER PUBLICATIONS

Franciska De Jong et al.—"Access to recorded interviews: A research agenda"—Journal on Computing and Cultural Heritage (JOCCH) JOCCH Homepagearchive—vol. 1 Issue 1, Jun. 2008—Article No. 3 (pp. 3:1-3:27).*

(Continued)

*Primary Examiner* — Anh Ly
(74) *Attorney, Agent, or Firm* — Thomas | Horstemeyer, LLP

(57) ABSTRACT

Disclosed are various embodiments of a content management application that facilitates a content management system. Content items that can include audio and/or video can be stored in the content management system. A transcript is generated that corresponds to spoken words within the content. Content can be tagged based upon the transcript. Content anomalies can also be detected as well as editing functionality provided.

27 Claims, 7 Drawing Sheets

(56) References Cited

U.S. PATENT DOCUMENTS

| | | | |
|---|---|---|---|
| 2011/0112832 A1* | 5/2011 | Prorock et al. | 704/235 |
| 2012/0011109 A1* | 1/2012 | Ambwani et al. | 707/722 |
| 2012/0144415 A1* | 6/2012 | Velusamy et al. | 725/14 |
| 2013/0013991 A1* | 1/2013 | Evans | 715/206 |
| 2013/0036124 A1* | 2/2013 | Ambwani et al. | 707/749 |
| 2013/0067333 A1* | 3/2013 | Brenneman | 715/721 |
| 2013/0097197 A1* | 4/2013 | Rincover et al. | 707/766 |
| 2013/0114899 A1* | 5/2013 | Ambwani et al. | 382/176 |
| 2013/0179968 A1* | 7/2013 | Ciocarlie et al. | 726/22 |
| 2013/0191415 A1* | 7/2013 | Ambwani et al. | 707/770 |

OTHER PUBLICATIONS

M Larson, GJF Jones—"Spoken content retrieval: A survey of techniques and technologies"—Foundations and Trends in Information Retrieval—doras.dcu.ie—vol. 5, Nos. 4-5 (2011) pp. 235-422).*

* cited by examiner

MANAGEMENT OF CONTENT ITEMS

BACKGROUND

Content management systems can be utilized to organize, manage, and/or distribute content to various users for various purposes. For example, in a learning environment, users can access content provided by a content management system through various types of user interfaces. For example, the content management system can house and manage content that served up to clients via a network by a web server that retrieves content from the content management system. The content managed by a content management system can comprise, for example, learning content that is arranged into various learning units. Content can also comprise, for example, content associated with an electronic commerce site (e.g., product information) that is placed in web pages and transmitted to a client device. Accordingly, updating of content, particularly multimedia content items, can present a challenge, particular for large and diverse content sets.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure are related to content management systems that can manage various types of content, including video, audio, imagery, documents, other binary file types, and/or other content. For example, a content management system can comprise a learning content management system that manages content for the purposes of learning and/or training. A learning content management system can maintain various learning units, which can include various types of content arranged into various chapters, hierarchies, nodes, or other arrangements that a user may access.

A content management system according to the present disclosure can house and/or manage content that can be accessed in various ways. In some embodiments, the content management system can render a user interface that is accessible via a network that allows users to view content accessible via the content management system. In other embodiments, content accessible via the content management system can be accessed via another system, such as an application that assembles dynamically generated web pages or other forms of content that are in turn sent to a requesting client device via a network.

Accordingly, when content managed by a content management system includes video content, audio content, imagery, documents in proprietary binary form, or other formats, updating content can present management challenges. For example, in an enterprise environment, look and feel guidelines may exist that specify guidelines regarding content that is published in a content management system. As these guidelines are changed over time, identifying conformance of content housed by the content management system to these guidelines can offer a challenge. Additionally, as another example, the names of products or services or other terminology associated with content can change over time. Therefore, assuring that content housed by the content management system is up to date, particularly where audio and/or video content is employed, is yet another logistical challenge. Additionally, where multimedia content is employed in the content management system, the content management system, according to an embodiment of the disclosure, can identify audio and/or video anomalies that can be flagged, potentially removed, and/or otherwise edited in order to improve the quality of content housed in the content management system.

Figure 1:
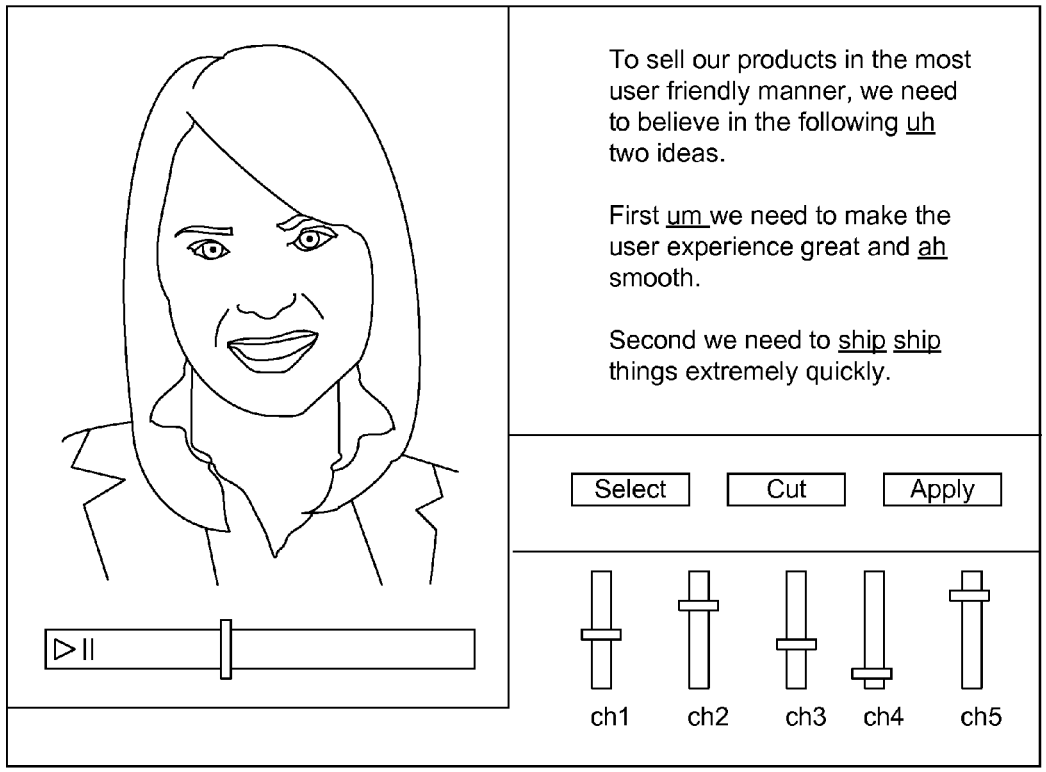
FIG. 1 is a drawing of one example of a user interface generated by a content management system according to an embodiment of the disclosure.

Therefore, with reference to FIG. 1, shown is an example of a user interface 100 that can be generated by a content management system according to an embodiment of the disclosure. In the depicted example, a user interface that allows an administrative user to access content managed by the content management system is shown. In this introductory example, the user interface depicts an example of a content item stored in a content management system, which in this case is video content. The content item can be viewed by an administrative user to identify potential content anomalies, such as one or more audio anomalies.

In the example shown in FIG. 1, the content management system can identify as well as highlight potential audio anomalies to an administrative user. In the case of FIG. 1, these anomalies can comprise verbal anomalies or spoken word anomalies. For example, content management systems can analyze a content item to identify interjections, utterances, mumblings, or sounds identified in the content item that may be potentially distracting to the user. The content management system can also provide the ability within the user interface 100 for the user to edit the content item to remove and/or otherwise edit the content item to eliminate and/or reduce the impact of the detected audio anomalies. As shown in the depicted introductory example of FIG. 1, the content management system, according to an embodiment of the disclosure, can identify potential content anomalies to an administrative user and provide a playback interface so that these anomalies can be reviewed by a user. Additionally, the content management system can also provide video and/or audio editing functionality so that the user can address the content anomalies by removing content from the content item and/or making other types of adjustments. Other examples of functionality of a content management system according to embodiments of the disclosure are shown and discussed herein.

Figure 2:
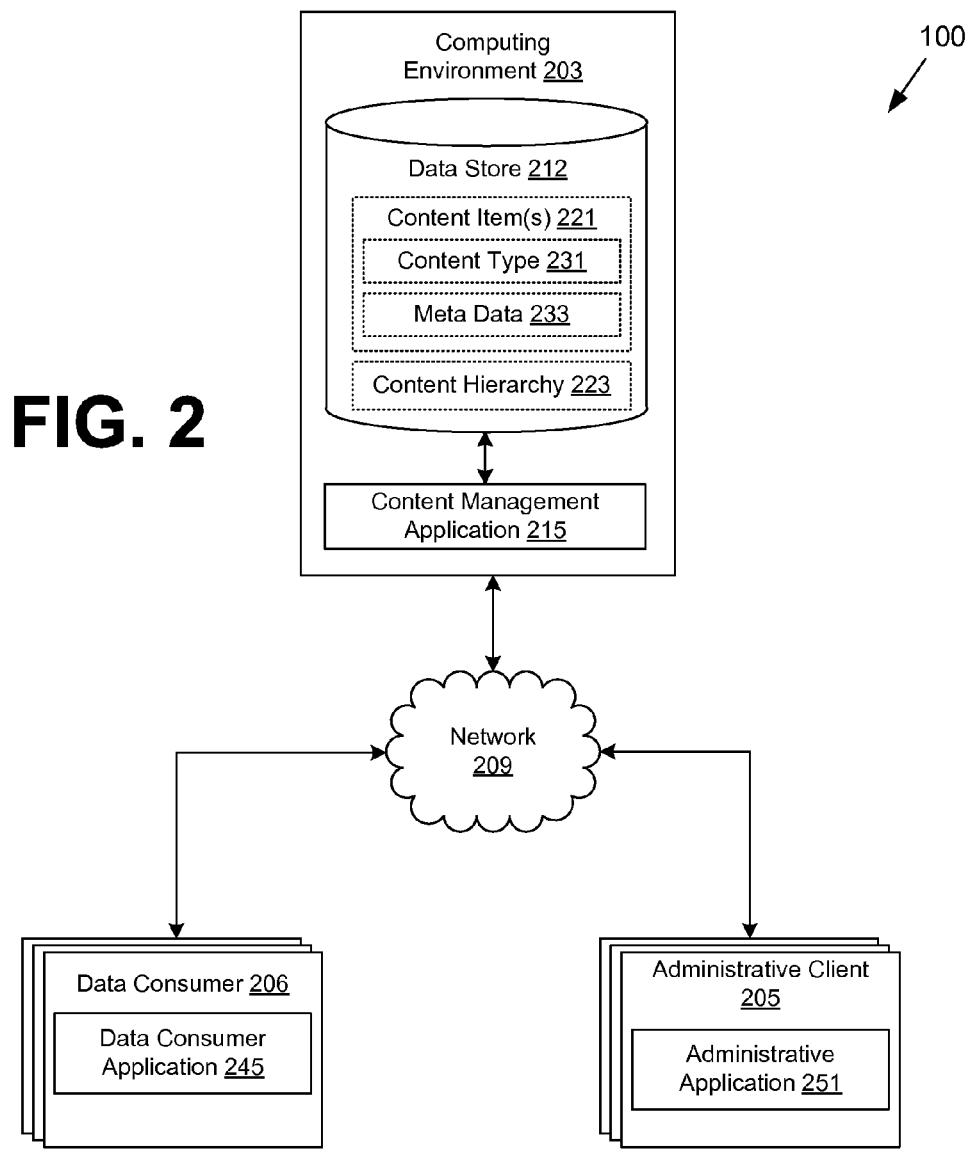
FIG. 2 is a drawing of a networked environment facilitating a content management system according to various embodiments of the disclosure.

With reference to FIG. 2, shown is a networked environment 200 according to various embodiments. The networked environment 200 includes a computing environment 203 and at least one data consumer 206, which are in data communication with each other via a network 209. The network 209 may include, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content management application 215 and other applications, services, processes, systems, engines, or functionality not discussed in detail herein. The content management application 215 provides the functionality of a content management system. For example, the content management application 215 can provide user interfaces through which content managed by the content management system can be accessed, managed, edited, or otherwise manipulated by administrative users. The content management application 215 can also provide one or more interfaces (e.g., a web services application programming interface) through which content can be accessed by other systems for presentation to users consuming content that is managed by the content management system. For example, a system charged with assembling dynamically generated web pages from content housed within the content management system can access content via a web services API provided by the content management application 215.

For example, the content management application 215 may communicate with a data consumer 206 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 209 in order to provide content that is housed within the content management system.

The data stored within the data store 212 includes, for example, content items 221, which are associated with a content type 231 as well as meta data 233 and a content hierarchy 223. Content items 221 represent audio content, video content, imagery, documents, text, or any type of content that can be housed in a content management system. For example, in the case of a learning content management system, content items 221 can represent training materials, such as videos, slide presentations, documents, or other training collateral that can be associated with a training topic or training module. Content items 221 can also represent documents in open and/or proprietary formats that contain textual content, embedded imagery, video, audio, and/or any other forms of content.

To this end, content items 221 can be tagged with a content type 231 that specifies a content type of the content item 221. Additionally, content items 221 can also be associated with meta data 233 that is generated by the content management application 215 to facilitate embodiments of the disclosure. Meta data 233 can include one or more descriptive tags that are automatically and/or manually generated and associated with a content item 221. Meta data 233 can also include a transcript of spoken words that are contained with the content item 221 that can be generated by the content management application 215. Meta data 233 can include any other information about a content item 221 that can be utilized by the content management application 215 to manage content in the content management system.

The data store 212 can also store content hierarchy 223 data that describes how the various content items 221 are arranged with relation to one another. The content hierarchy 223 can describe a hierarchical structure where certain content items 221 are nodes in a tree-like structure. It should also be appreciated that content items 221 need not be arranged in a hierarchy. For example, the various content items 221 can simply be stored along with meta data 233 in the data store 212, and the content management application 215 can locate content items 221 in the data store 212 via tags that are stored in the meta data 233, an index of content items 221 stored in the data store 212 or any other method of organizing content items 221 as can be appreciated.

The administrative client 205 is representative of one or more devices that may be coupled to the network 209. The administrative client 205 may comprise, for example, a processor-based system such as a computer system. Such a computer system may be embodied in the form of a server, computing environment, desktop computer, a laptop computer, personal digital assistants, cellular telephones, smartphones, set-top boxes, music players, web pads, tablet computer systems, game consoles, electronic book readers, or any other devices with like capability.

The administrative client 205 may be configured to execute various applications such as an administrative application 251 and/or other applications. The administrative client 205 may be configured to execute applications beyond the administrative application 251 such as, for example, mobile applications, email applications, instant message applications, and/or other applications. The administrative application 251 may correspond, for example, to a browser, mobile application, or other type of special purpose application that accesses and renders network pages, such as web pages, or other content served up by the content management application 215 for the purposes of administering the content management system.

The administrative client 205 comprises a computing device on which an administrative user can communicate with the content management application 215 via the network 209 to access user interfaces that facilitate management, updating, and other administrative tasks with respect to a content management system. For example, an administrative user can, via the administrative application 251, access administrative functionalities provided by the content management application 215 as discussed herein and as can be appreciated by a person of ordinary skill in the art.

The data consumer 206 is representative of one or more devices that may be coupled to the network 209. The data consumer 206 may comprise, for example, a processor-based system such as a computer system. Such a computer system may be embodied in the form of a server, computing environment, desktop computer, a laptop computer, personal digital assistants, cellular telephones, smartphones, set-top boxes, music players, web pads, tablet computer systems, game consoles, electronic book readers, or any other devices with like capability.

The data consumer 206 may be configured to execute various applications such as a data consumer application 245 and/or other applications. The data consumer 206 may be configured to execute applications beyond the data consumer application 245 such as, for example, mobile applications, email applications, instant message applications, and/or other applications. The data consumer application 245 may correspond, for example, to a browser or mobile application that accesses and renders network pages, such as web pages, or other network content served up by the content management application 215. The data consumer application 245 may also represent, for example, a web server or other application tasked with assembling a dynamically generated web page from content items 221 via the content management application 215. In such a scenario, the data consumer application 245 can access content via a web services API provided by the content management application 215 and insert content items 221 into content pages generated by the data consumer application 245.

Accordingly, the content management application 215, as noted above, can facilitate a content management system in that it can provide access to content items 221 in the data store 212 to data consumers 206 for various purposes. Additionally, the content management application 215 can facilitate management of content items 221 stored in the data store 212. In one embodiment, the content management application 215 can facilitate the creation of transcripts that correspond to spoken words within content items 221 (e.g., audio content, video content). Accordingly, the content management application 215 can perform a speech to text analysis of content items 221 having a content type 231 corresponding to audio and/or video content to generate a transcript of the content item 221. The transcript generated by the content management application 215 can be stored as meta data 233 of the content item 221 in the data store 212 and can also identify time codes in the content item 221 in which the identified spoken words occur. In some embodiments, the content management application 215 can generate tags that correspond to the words appearing in the transcript and tag the content item 221 and/or its corresponding meta data 233.

The content management application 215 can also perform an image recognition analysis of video content in the data store 212 to identify textual content that appears within images and/or video frames of a content item 221. The content management application 215 can then tag the content item 221 with identified text in the meta data 233 of the content item 221.

Accordingly, using the transcript and/or tags generated by the content management application 215 after an analysis of a content item 221, the content management application 215 can facilitate search and retrieval of content items 221 that match a certain search term. Such a search can also yield particular portions of a content item 221 that are related to a search term (e.g., a clip of a content item). Additionally, the content management application 215 can also provide editing functionality that allows an administrative user to edit the content item 221 or a portion thereof that is related to the search term.

Therefore, in one example, if the name of a product that is discussed in a training module in a learning content management system has changed, the content management application 215 can perform a search of the content items 221 in the data store and/or a particular node of a content hierarchy 223 to identify those content items 221 that contain the name of the product (e.g., by identifying content items 221 being tagged with the name or in which the name appears in its transcript). The content management application 215 can then facilitate editing of the content items 221 by replacing portion of a video, redubbing an audio track containing the name, removing a portion of the video and/or audio, as well as adjusting an audio track equalization settings.

The speech to text analysis performed by the content management application 215 can also facilitate other content management tasks. For example, the content management application 215 can facilitate identification of content anomalies such as an audio anomaly. As one example, the content management application 215 can identify interjections, verbal stutters or ticks, non-lexical utterances, etc., that occur within the audio of a content item 215. Audio anomalies can also comprise white noise that is present in an audio track associated with a content item 215. An audio anomaly can also include extended periods of silence or near silence in an audio track. In other words, the audio anomaly can include a predetermined amount of time where a volume level is substantially constant in an audio track associated with the content item. These audio anomalies can be flagged by the content management application 215 and subsequently removed via an automated or manual task. The content management application 215 can flag such an anomaly by flagging a time code associated with the anomaly in the meta data 233 of the content item 221. An audio anomaly can also comprise any other noises or sounds that may serve as a distraction to a consumer of a content item 215 that includes audio or video. For example, background noises that exceed a certain volume level can be identified and flagged. More generally, any sounds in the content item 221 that have a frequency and/or volume that is outside of a specified range of acceptable frequency and/or volume levels can be flagged in the content item 221 via a time code of the anomaly in the meta data 233.

The content management application 215 can also be configured to identify audio and/or video anomalies that are potentially intentionally inserted into a content item 221 for later identification or retrieval. For example, when filming a video for inclusion into a content management system, users may intentionally introduce an audio anomaly as a cue for later identification. As one case, if a user misspeaks when filming a video segment for inclusion into the content management system, the user may clap or speak one or more words and continue filming the segment. Subsequently, when the video is incorporated into the data store 212, the content management application 215 can identify such a cue and facilitate easy access to and editing of the content item 215 by an administrative user. As another case, a user may insert a video cue, such as a clapperboard cue, that can be identified for later retrieval and editing of the content item 221.

The content management application 215 can also identify video anomalies that may occur within video content in the data store 212. Accordingly, the content management application 215 can perform an image recognition analysis of video content in the data store 212 to identify whether the look and feel of the video complies with style guidelines. For example, the content management application 215 can analyze the orientation of textual content and/or imagery within a content item 221 to determine, for example, whether they comply with style guidelines that specify fonts for on-screen textual content as well as orientation and/or positioning of textual or other types elements (e.g., whether certain elements are centered, horizontal positioning, vertical positioning, etc.).

The content management application 215 can also determine the presence and/or absence of certain video elements in a content item 221 as specified by content guidelines or rules. For example, the content management application 215 can determine whether a certain lead-in and/or lead-out or other visual element (e.g., credit sequence, title sequence, headers, footers, etc.) is present within a particular content item 221 and flag the content item 221 for an administrative user.

Figure 3:
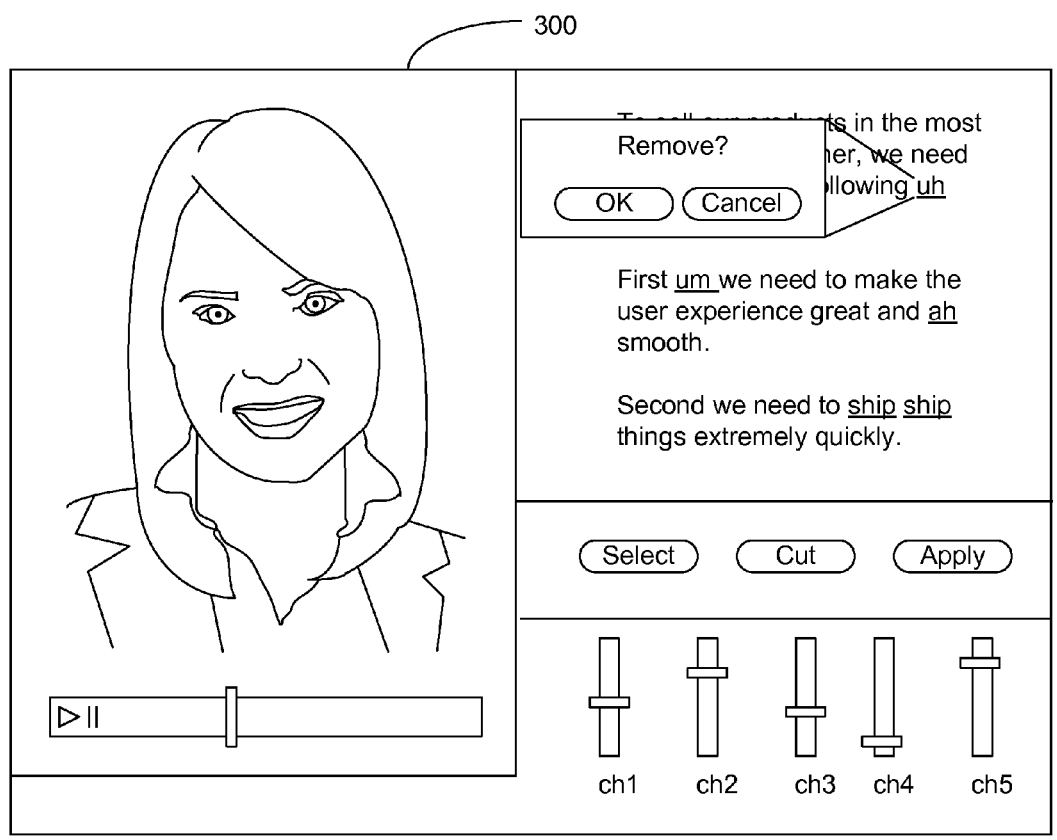
FIGS. 3-5 are drawings of user interface examples generated by a content management system according to various embodiments of the disclosure.

Reference is now made to FIG. 3, which illustrates an example of how the content management application 215 can facilitate detection and/or removal of content anomalies in content items 221 in a content management system. In the depicted example, a user interface 300 is shown that can be generated by the content management application 215 and rendered in an administrative client 205. In the example user interface 300, the content management application 215 can identify audio anomalies associated with a particular content item 221 and allow an administrative user to view the content item 221 and/or portion of the content item 221 associated with the detected anomalies. In the example of FIG. 3, the content management application 215 can display the transcript or a portion thereof that is associated with the content item 221 in the meta data 233 in the data store 212. Additionally, the user interface 300 can allow the administrative user to remove the anomaly from content item. Additionally, the content management application 215 can also provide other content editing functionality so that an administrative user may remix or otherwise manipulate the content item 221 as can be appreciated.

Figure 4:
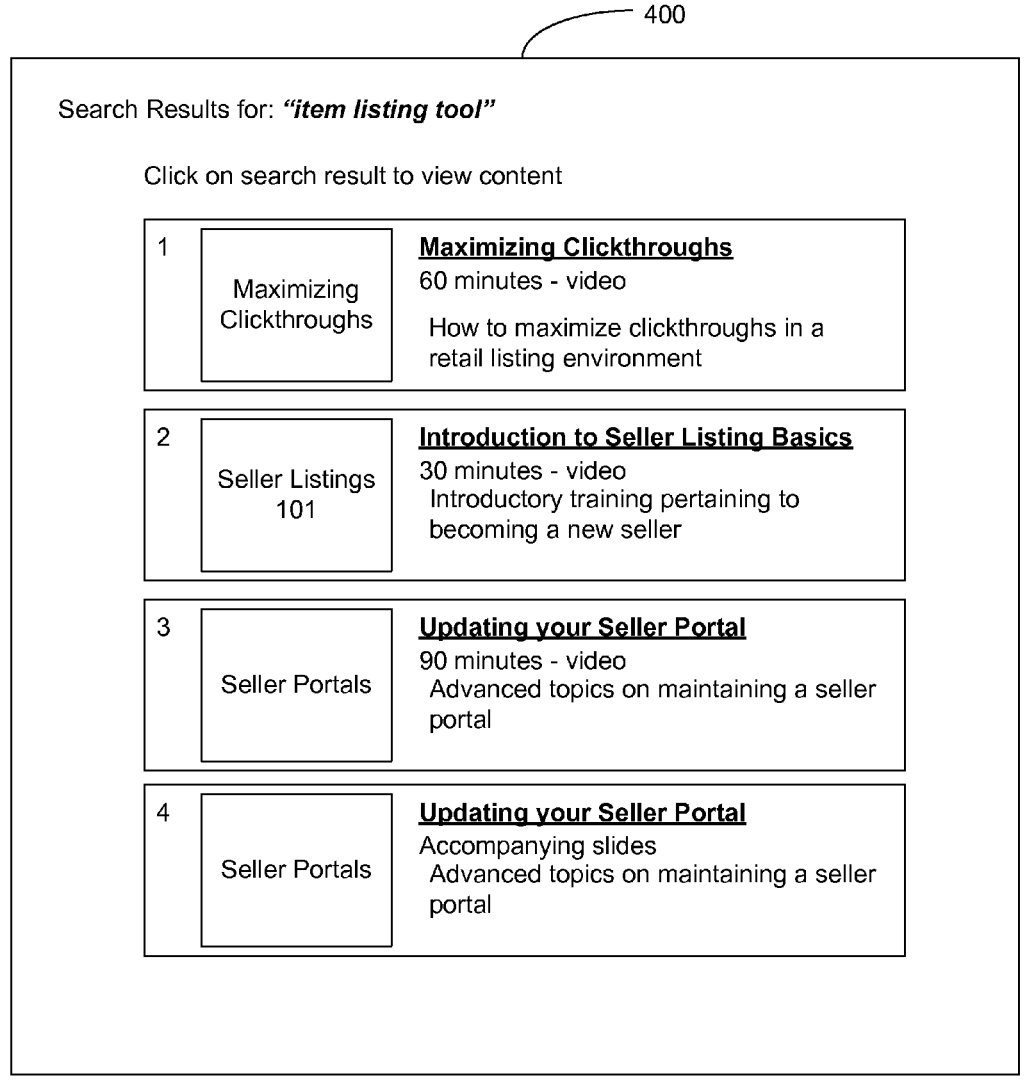

Reference is now made to FIG. 4, which illustrates another example of a user interface 400 that can be generated by the content management application 215 and rendered in an administrative client 205. In the depicted example, a search results user interface is shown that is responsive to a search query submitted by a user, such as an administrative user. In response to receiving a search query, the content management application 215 can identify content items 221 in the data store 212 that are relevant to the search query based upon the meta data 233 of the various content items 221. For example, as noted above, the meta data 233 can include one or more tags as well as a transcript identifying the spoken words within the content item 221.

As shown in FIG. 4, a user can submit a search query that can related to, for example, content that the user wishes to update in the content management system. Accordingly, the content management application 215 can locate content related to the search query from among content items 221 in the data store 212 and present the search results to the administrative user in the user interface 400 shown in FIG. 4.

Figure 5:
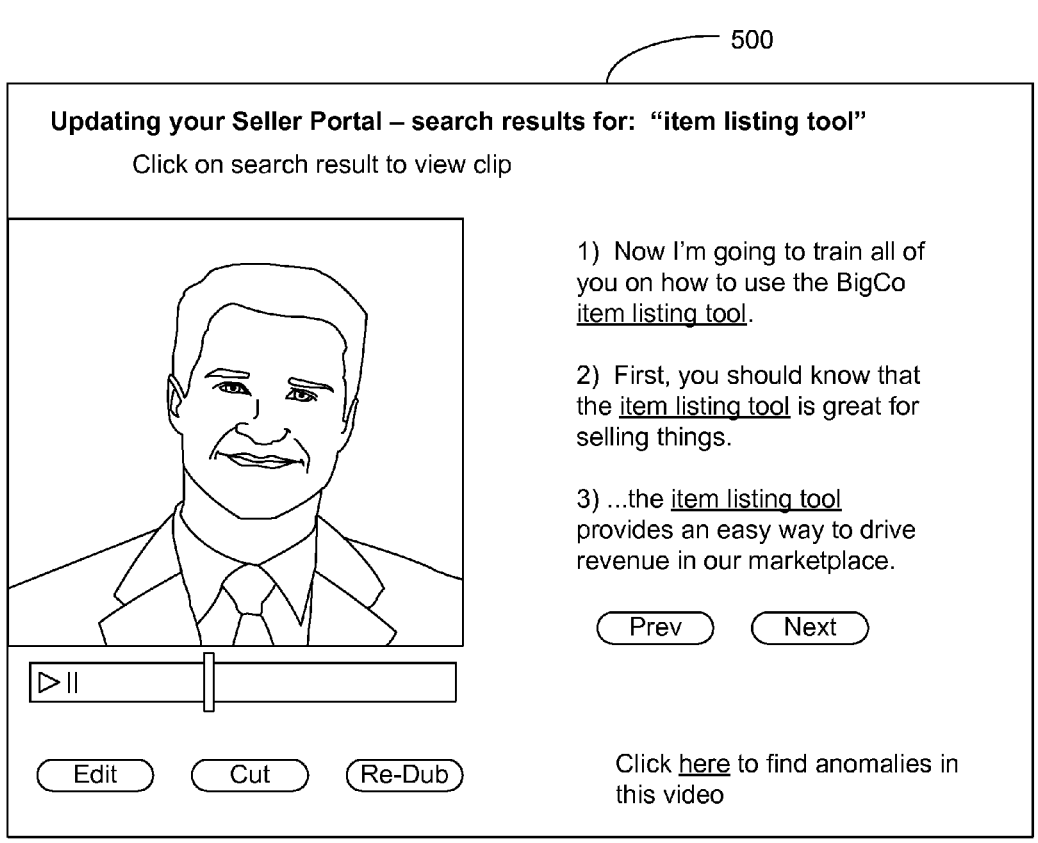

Continuing the example of FIG. 4, reference is now made to FIG. 5, which illustrates an example of a user interface 500 that can be generated by the content management application 215 and rendered in an administrative client 205. In the example of FIG. 5, the administrative user has selected one of the search results shown in the example of FIG. 4. Accordingly, in the user interface 500 of FIG. 5, the content management application 215 can present to the user portions of the content item 221 that incorporate the search term by identifying from the transcript associated with the content item 221 a time code corresponding to the search term. In other words, the content management application 215 can identify the various occurrences in the content item 215 of the search term submitted by the user.

Accordingly, the content management application 215 can also provide editing capabilities to allow the user to redub, remove, or perform other editing functions to the portion of the content item 221 containing the search term. Furthermore, as shown in the depicted example, the administrative user can also browse the content item 221 for other occurrences of the search term and perform editing functions to portions of the content item 221 at which the remaining occurrences exist.

Figure 6:
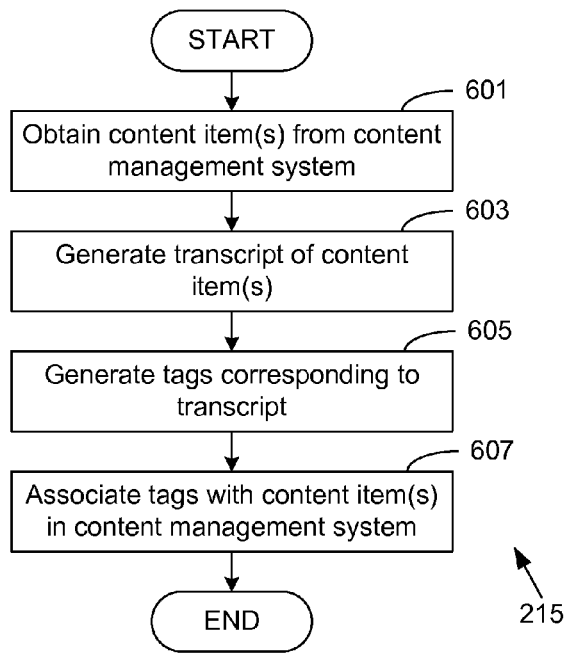
FIGS. 6-7 are flowcharts illustrating examples of functionality implemented as portions of the content management application executed in a computing environment in the networked environment of FIG. 2 according to various embodiments of the present disclosure.

Moving on to FIG. 6, shown is a flowchart that provides one example of the operation of a portion of the content management application 215 according to various embodiments. It is understood that the flowchart of FIG. 6 provides merely an example of the many different types of functional arrangements that may be employed to implement the operation of the portion of the content management application 215 as described herein. As an alternative, the flowchart of FIG. 6 may be viewed as depicting an example of steps of a method implemented in the computing environment 203 (FIG. 1) according to one or more embodiments.

First, in box 601, the content management application 215 obtains a content item associated with a content management system. In other words, the content management application 215 obtains a content item 221 that saved in the data store 212. In box 603, the content management application 215 generates a transcript of the content item 221 corresponding to the spoken words in the content item. In box 605, the content management application 215 generates one or more tags corresponding to the transcript that can be associated with the meta data 233 of the content item 221 in the data store 212. The tags can identify time codes in the content item 221 to which specific words in the transcript correspond. In box 607, the content management application 215 associates the tags with the content item 221 in the content management system.

Figure 7:
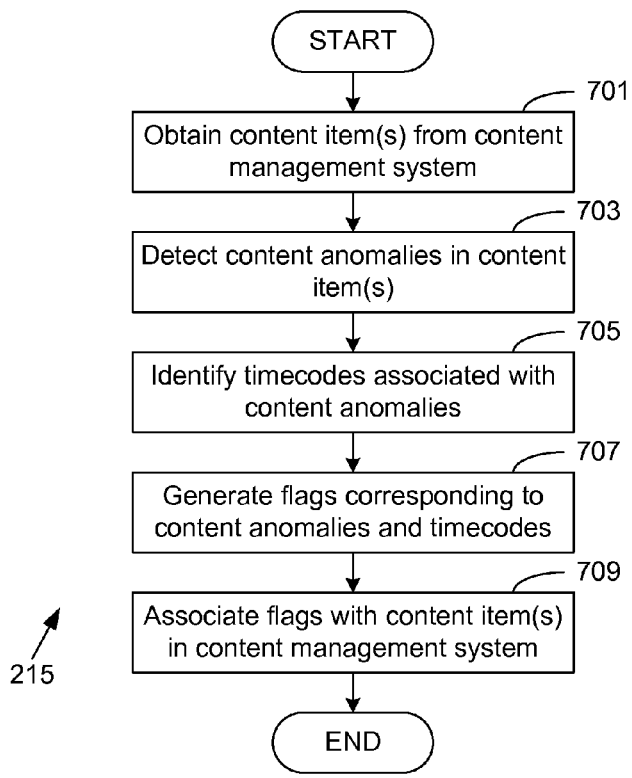

Moving on to FIG. 7, shown is a flowchart that provides one example of the operation of a portion of the content management application 215 according to various embodiments. It is understood that the flowchart of FIG. 7 provides merely an example of the many different types of functional arrangements that may be employed to implement the operation of the portion of the content management application 215 as described herein. As an alternative, the flowchart of FIG. 7 may be viewed as depicting an example of steps of a method implemented in the computing environment 203 (FIG. 1) according to one or more embodiments.

First, in box 701, the content management application 215 obtains a content item associated with a content management system. In other words, the content management application 215 obtains a content item 221 that saved in the data store 212. In box 703, the content management application 215 can detect content anomalies associated with the content item 221. As noted above, content anomalies can comprise anomalies related to sound, imagery, placement of video elements, orientation of textual elements, the look and feel of textual elements, and other anomalies as can be appreciated. In box 705, the content management application 215 can identify time codes in the content item 221 that are associated with the detected content anomalies. In box 707, the content management application 215 can generate corresponding time codes that correspond to the content anomalies, and in box 709, the flags can be associated with the meta data 233 of the content item 221 in the data store 212. As noted above, the content management application 215 can also provide editing functionality that allows an administrative user to edit the content item 221 to remove, redub, or otherwise manipulate the content item 221 in response to detection of content anomalies.

Figure 8:
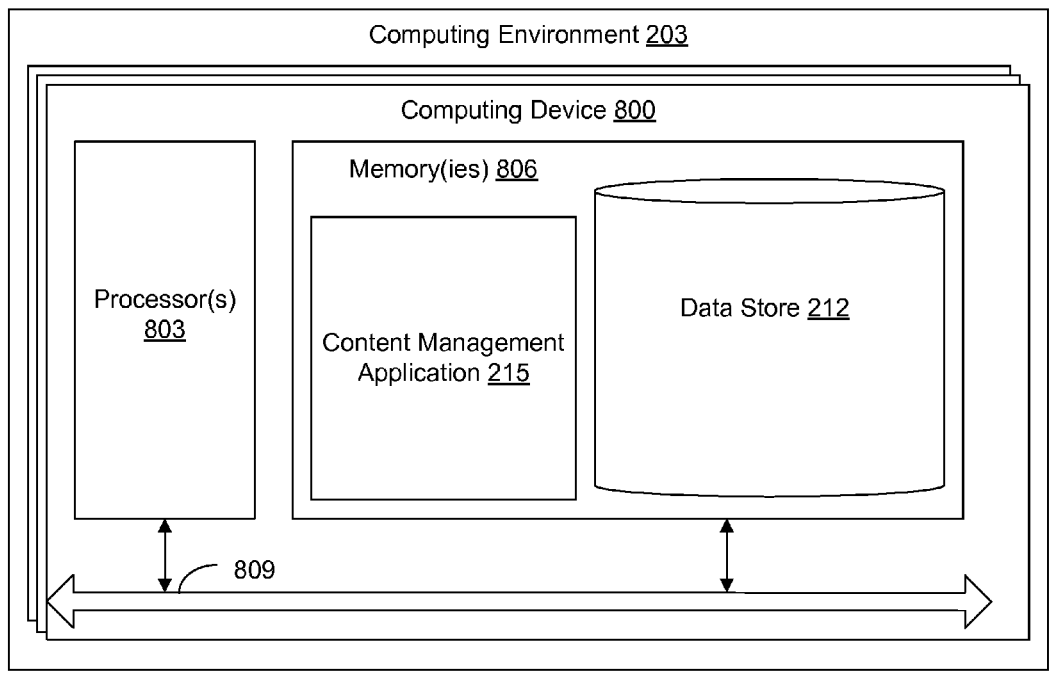
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more appropriate computing device 800. The appropriate computing device 800 includes at least one processor circuit, for example, having a processor 803 and a memory 806, both of which are coupled to a local interface 809. To this end, the appropriate computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 is the content management application 215 and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the content management application 215, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 6-7 show the functionality and operation of an implementation of portions of the content management application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIG. 6-7 show a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIGS. 6-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content management application 215, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable storage medium embodying a program executable in at least one computing device, comprising:
   code that generates a respective transcript for each of a plurality of content items in a content management system by a speech to text analysis of the plurality of content items, the respective transcript identifying a plurality of spoken words in each of the plurality of content items;
   code that associates the respective transcript with a respective one of the plurality of content items in the content management system;
   code that identifies a plurality of time codes, wherein each of the plurality of time codes identify a time that a spoken word occurs within one of the plurality of content items;
   code that generates an administrative user interface;
   code that transmits the administrative user interface to a client device;
   code that obtains a search term via the administrative user interface;
   code that identifies at least one tag, corresponding to the search term; and
   code that edits a portion of a content item associated with the at least one tag, wherein the portion of the content item corresponds to a respective time code associated with the at least one tag.

2. The non-transitory computer-readable storage medium of claim 1, wherein the code that edits the portion of the content item further comprises code that redubs an audio track associated with the content item.

3. The non-transitory computer-readable storage medium of claim 1, wherein the code that edits the portion of the content item further comprises code that removes the portion of the content item.

4. A system, comprising:
   at least one computing device;
   an application executable in the at least one computing device, the application comprising:
      logic that generates a transcript, wherein the transcript identifies a plurality of words contained within a content item;
      logic that associates the transcript with the content item in a content management system;
      logic that identifies a plurality of time codes, wherein each of the plurality of time codes identify a time that a respective word occurs within the content item;
      logic that generates a plurality of tags, wherein each of the plurality of tags associate each of the plurality of time codes with the respective word;
      logic that associates the plurality of tags with the content item in the content management system;
      logic that generates an administrative user interface;
      logic that transmits the administrative user interface to a client device;
      logic that obtains a search term via the administrative user interface;
      logic that identifies at least one tag from the plurality of tags that corresponds to the search term; and
      logic that preforms an action to a portion of the content item;
   wherein the portion of the content item corresponds to a respective time code associated with the at least one tag.

5. The system of claim 4, wherein the transcript identifies a plurality of spoken words contained within the content item.

6. The system of claim 4, wherein the application further comprises:
   logic that performs an image recognition analysis of the content item that identifies textual content appearing within the content item; and
   logic that associates the identified textual content with the content item in a content management system.

7. The system of claim 4, wherein the action comprises logic that edits the portion of the content item.

8. The system of claim 7, wherein the logic that edits the portion of the content item comprises logic that replaces an audio track associated with the portion of the content item.

9. The system of claim 4, wherein the application further comprises:
   logic that identifies a content anomaly in the content item; and
   logic that flags another time code associated with the content anomaly within the content management system, the other time code representing another portion of the content item containing the content anomaly.

10. The system of claim 9, wherein the content anomaly further comprises an audio anomaly.

11. The system of claim 9, wherein the application further comprises logic that associates the other time code with the content item in a content management system.

12. The system of claim 11, wherein the application further comprises:
   logic that obtains a cue via the administrative user interface;
   logic that identifies at least one other time code; wherein the cue corresponds to the content anomaly associated with the at least one other time code; and logic that preforms another action to the other portion of the content item associated with the at least one other time code.

13. The system of claim 12, wherein the other action comprises logic that removes the other portion of the content item.

14. The system of claim 12, wherein the other action comprises logic that edits the other portion of the content.

15. The system of claim 4, wherein, each of the plurality of time codes identify a time that a plurality of words occurs within the content item.

16. A method, comprising:
- identifying, in at least one computing device, a content anomaly associated with a video content item stored in a data store associated with a content management system;
- identifying, in the at least one computing device, a corresponding time code in the video content item that is associated with the content anomaly;
- generating, in the at least one computing device, a flag associating the content anomaly and the corresponding time code with one another, the flag identifying the content anomaly within the content management system; and
- performing, via the at least one computing device, an action to a portion of the video content item, corresponding to the corresponding time code, wherein the action is one of removing the portion or redubbing an audio track associated with the portion.

17. The method of claim 16, wherein generating the flag further comprises embedding a time code associated with the content anomaly in a tag associated with the video content item in the content management system.

18. The method of claim 16, wherein the content anomaly further comprises an audio anomaly.

19. The method of claim 18, wherein the audio anomaly is associated with a volume level that fails to vary by a predetermined amount over a specified period of time.

20. The method of claim 18, wherein the audio anomaly comprises white noise.

21. The method of claim 18, wherein the audio anomaly is associated with a volume that is outside of a specified volume range.

22. The method of claim 18, wherein the audio anomaly is associated with a frequency that is outside of a specified frequency range.

23. The method of claim 16, wherein the content anomaly further comprises a video anomaly.

24. The method of claim 23, wherein the video anomaly further comprises formatting of at least one of text or imagery appearing with a video content associated with the video content item.

25. The method of claim 24, wherein identifying the content anomaly further comprises:
- identifying text in the video content item; and
- identifying an orientation of the text within the video content, wherein the orientation of the text deviates from a specified orientation.

26. The method of claim 23, wherein the video anomaly further comprises an absence of a video element within a segment of video content.

27. The method of claim 26, wherein the video element is one of a lead-in video element or a lead-out element.

* * * * *